(12) United States Patent
Savage et al.

(10) Patent No.: US 8,761,233 B2
(45) Date of Patent: Jun. 24, 2014

(54) WIDEBAND LOW LATENCY REPEATER AND METHODS

(75) Inventors: Lee M. Savage, Santa Barbara, CA (US); James E. Henry, Goleta, CA (US); Jeffrey J. Becker, Goleta, CA (US); David Brent Wilson, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/492,625

(22) Filed: Jun. 8, 2012

(65) Prior Publication Data

US 2013/0329771 A1 Dec. 12, 2013

(51) Int. Cl.
H04B 3/36 (2006.01)
H04B 7/17 (2006.01)
H04B 17/02 (2006.01)
H04L 25/20 (2006.01)
H04L 25/52 (2006.01)

(52) U.S. Cl.
USPC .......................................................... 375/211

(58) Field of Classification Search
USPC ..................................... 375/326, 235; 342/14
See application file for complete search history.

(56) References Cited

U.S. PATENT DOCUMENTS

| 4,318,183 | A | 3/1982 | Byington et al. |
| 5,828,705 | A * | 10/1998 | Kroeger et al. ................ 375/326 |
| 6,624,780 | B1 | 9/2003 | Fouts et al. |
| 6,678,320 | B1 * | 1/2004 | Aydin ........................... 375/235 |
| 6,975,693 | B1 * | 12/2005 | Hillery et al. ................. 375/350 |
| 2004/0178944 | A1 | 9/2004 | Richardson et al. |
| 2008/0198060 | A1 * | 8/2008 | Shani et al. ..................... 342/14 |
| 2008/0266152 | A1 | 10/2008 | Durtschi |

FOREIGN PATENT DOCUMENTS

EP 1 039 716 A1 9/2000

OTHER PUBLICATIONS

Lyons, "Quadrature Signals: Complex, But Not Complicated", Copyright Nov. 2008, Richard Lyons (17 pgs.).
Kirkhorn, "Introduction to IQ-demodulation of RF-data", Johan Kirkhorn, IFBT, NTNU, Sep. 15, 1999 (13 pgs.).
Written Opinion of the International Searching Authority for International Application No. PCT/US2013/034644, filed Mar. 29, 2013, Written Opinion of the International Searching Authority mailed Jun. 24, 2013 (6 pgs.).
International Search Report for International Application No. PCT/US2013/034644, filed Mar. 29, 2013, International Search Report dated Jun. 13, 2013 and mailed Jun. 24, 2013 (4 pgs.).

* cited by examiner

*Primary Examiner* — Chieh M Fan
*Assistant Examiner* — Wednel Cadeau
(74) *Attorney, Agent, or Firm* — Christie, Parker & Hale, LLP

(57) ABSTRACT

A signal repeater (200) includes a signal processing part (202) and a signal repeating part (204). The signal processing part includes a converter (300) configured to receive an input signal and to convert the input signal into quadrature signals, and a processor (302, 304, 306) configured to process the quadrature signals to determine one or more characteristics of the input signal, and to compare the one or more characteristics of the input signal and a plurality of predetermined characteristics to generate a comparison result. The signal repeating part (204) is configured to selectively repeat the input signal as a repeated signal in accordance with the comparison result.

14 Claims, 5 Drawing Sheets

US 8,761,233 B2

WIDEBAND LOW LATENCY REPEATER AND METHODS

FIELD

Aspects of the present invention generally relate to radar systems, and, more specifically, to signal repeaters for electronic attack systems and methods.

BACKGROUND

In modern warfare, radar guided weapons are widely deployed. For example, a radar guided missile can home in on an enemy target from a great distance at a high rate of speed. Therefore, slow moving targets such as surface ships are highly vulnerable to radar guided missiles due to their relatively slow maneuvering speed. Accordingly, surface ships or other slow moving or stationary platforms have been equipped with advanced defense system that can provide electronic attack/self protect capabilities against radar guided weapons. Such a defense system should be able to take immediate and appropriate responses to the radar signals emitted by fast approaching missiles or other radar guided weapons.

SUMMARY

According to an embodiment of the present invention, a signal repeater is provided. The signal repeater includes a signal processing part and a signal repeating part. The signal processing part includes a converter configured to receive an input signal and to convert the input signal into quadrature signals, and a processor configured to process the quadrature signals to determine one or more characteristics of the input signal and to compare the one or more characteristics of the input signal with a plurality of predetermined characteristics to generate a comparison result. The signal repeating part is configured to selectively repeat the input signal as a repeated signal in accordance with the comparison result.

According to an embodiment of the present invention, a method for operating a signal repeater is provided. The method includes: receiving an input signal and converting the input signal into quadrature signals; processing the quadrature signals to determine one or more characteristics of the input signal, and to compare the one or more characteristics of the input signal with a plurality of predetermined characteristics to generate a comparison result; and selectively repeating the input signal as a repeated signal in accordance with the comparison result.

BRIEF DESCRIPTION OF THE DRAWINGS

The above and other features and aspects of the present invention will become more apparent by describing in detail embodiments thereof with reference to the attached drawings.

DETAILED DESCRIPTION

Embodiments of the present invention are directed to a signal repeater that can support functions such as electronic attack (EA) technique, low latency threat emitter measurements for inhibiting EA on non-threat emitters, and realistic and flexible radar reflection synthesis. Generally known implementations of signal repeaters have been based on RF analog design, which are generally inflexible and have very restricted threat emitter measurement capabilities. According to embodiments of the present invention, a signal repeater can augment a legacy system such as an integrated receiver techniques generator (IRTG) to provide EA capabilities for threats requiring relatively low latency. However, the present invention is not limited to IRTG applications. In addition, the signal repeater of the present invention enables EA on a current received pulse to cope with frequency agility and to enable first pulse response.

Figure 1:
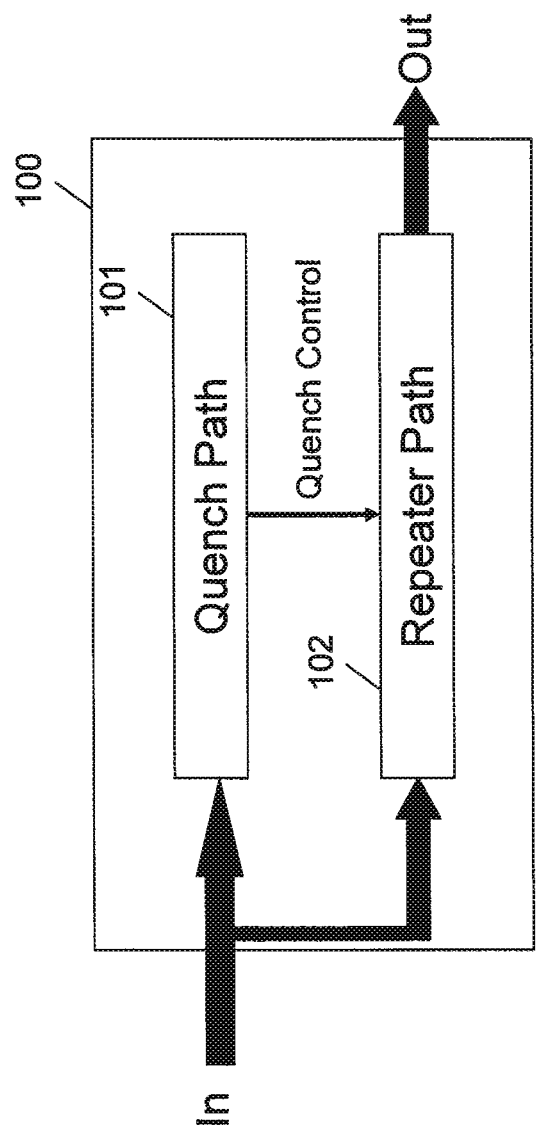
FIG. 1 is a block diagram of a signal repeater with a quench path and a repeater path according to an embodiment of the present invention.

FIG. 1 is a block diagram of a signal repeater 100 according to an embodiment of the present invention. The signal repeater 100 includes two paths: a quench path 101 and a repeater path 102. Both the quench path 101 and the repeater path 102 receive an input signal. The quench path 101 processes the input signal in the digital domain and performs emitter signal measurements on the input signal. If the measurements do not agree with preselected information (e.g., predetermined characteristics), then the repeater path 102 is inhibited (or quenched). When the repeater path 102 is inhibited, the input signal is not repeated by the repeater path 102. In other words, the quench path 101 controls the repeater path 102 to selectively repeat the input signal.

Figure 2:
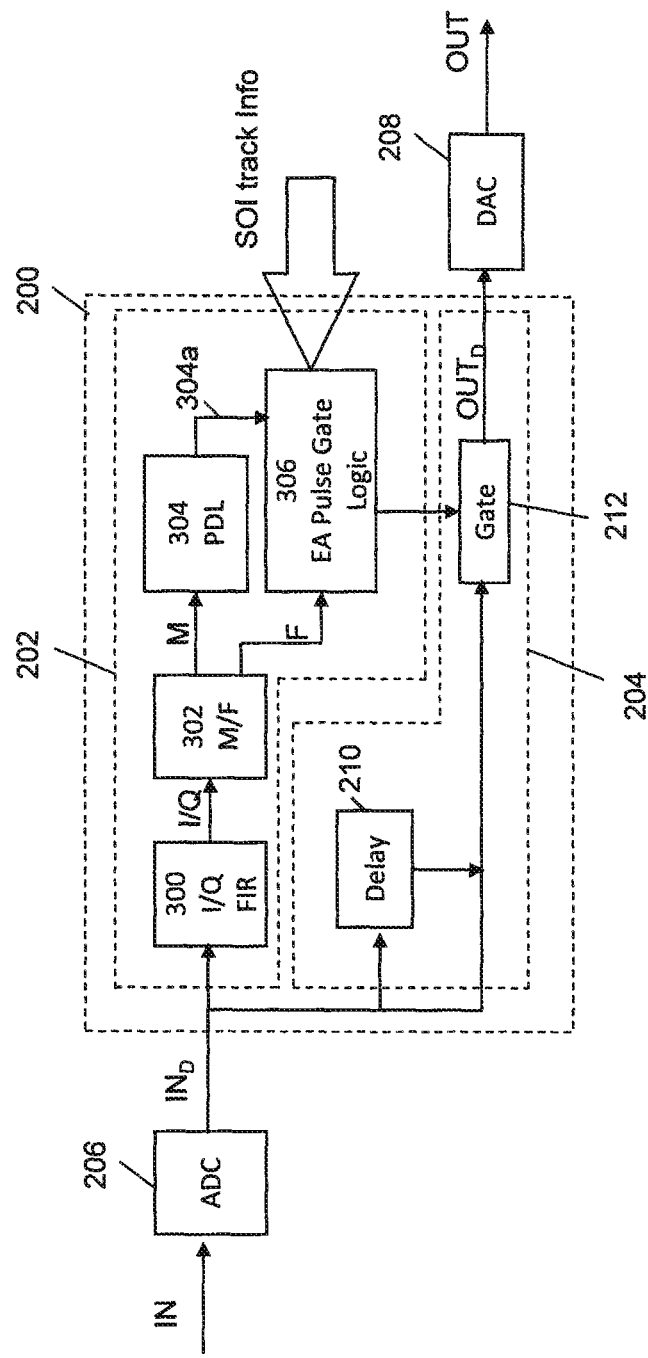
FIG. 2 is a block diagram conceptually illustrating the signal repeater of FIG. 1 in more details according to an embodiment of the present invention.

FIG. 2 is a block diagram conceptually illustrating a signal repeater 200 according to an embodiment of the present invention. Referring to FIG. 2, the signal repeater 200 includes a signal processing part 202 and a signal repeating part 204. An analog input signal IN (e.g., an IF signal) is converted to its corresponding digital signal $IN_D$ by an analog-to-digital converter (ADC) 206. Then, the digital signal $IN_D$ is processed by the signal processing part 202 and selectively repeated by the signal repeating part 204 as an output signal $OUT_D$ under the control of the signal processing part 202. The digital output signal $OUT_D$ can be converted back to an analog signal OUT by a suitable digital-to-analog converter (DAC) 208. The signal repeating part 204 has relatively low latency (e.g., a few nanoseconds), except for a delay 210, which will be described in more detail below. The signal processing part 202 performs various functions such as pulse detect and magnitude/frequency measurement functions, which introduce some latency (generally less than 30 nanoseconds in several embodiments).

The signal processing part 202 is provided with a priori information (e.g., signal of interest tracking information, hereafter "SOI track info") corresponding to the predetermined characteristics of the signals to be detected. The SOI track info enables the signal processing part 202 to recognize signals from predetermined hostile emitters, and can be provided by any suitable sources such as an IRTG. Provided with the SOI track info, the signal processing part 202 can determine whether the received signal IN comes from a friendly emitter or a hostile emitter. If the received signal IN is determined to be from a friendly emitter, the signal processing part 202 is configured to control the signal repeating part 204 such that the input signal $IN_D$ is not repeated (i.e., inhibited or quenched) as the output signal $OUT_D$ at the output of the signal repeating part 204.

In FIG. 2, the signal repeating part 204 includes a gate 212 that is controlled by the signal processing part 202. The signal processing part 202 outputs a control signal to enable or disable the gate 212. When the gate 212 is enabled, the input signal $IN_D$ is repeated as the output signal $OUT_D$. Therefore, when the received input signal IN is determined to be from a hostile emitter, the gate 212 is enabled so that the signal repeating part 204 can repeat the signal at the output thereof. The signal processing part 202 and the signal repeating part 204 will be described in more detail below.

Still reflecting to FIG. 2, the signal processing part 202 includes an I/Q FIR 300, a magnitude/frequency (M/F) processor 302, a pulse detect logic (PDL) 304, and an EA pulse gate logic (PGL) 306. The I/Q FIR 300 (e.g., a short non-decimated quadrature FIR) receives and converts the digitized $IN_D$ signal into corresponding I and Q signals for further processing. The M/F processor 302 calculates the magnitude (M) and frequency (F) of the input signal from the I and Q signals. The PDL 304 receives the magnitude (M) and is configured to detect the presence of a signal pulse in the input signal IN that corresponds to a preselected pulse profile according to the SOL track info. The EA PGL 306 receives a pulse presence signal 304a, which indicates a signal pulse is detected, from the PDL 304 and the frequency (F) from the M/F processor 302. The pulse presence signal 304a and the frequency (F) are compared with a number of parameters (e.g., predicted pulse gate, jitter, frequency ranges, pulse amplitude, etc.) of the SOI track info to determine whether the input signal IN is from a friendly emitter or a hostile emitter.

Figure 3:
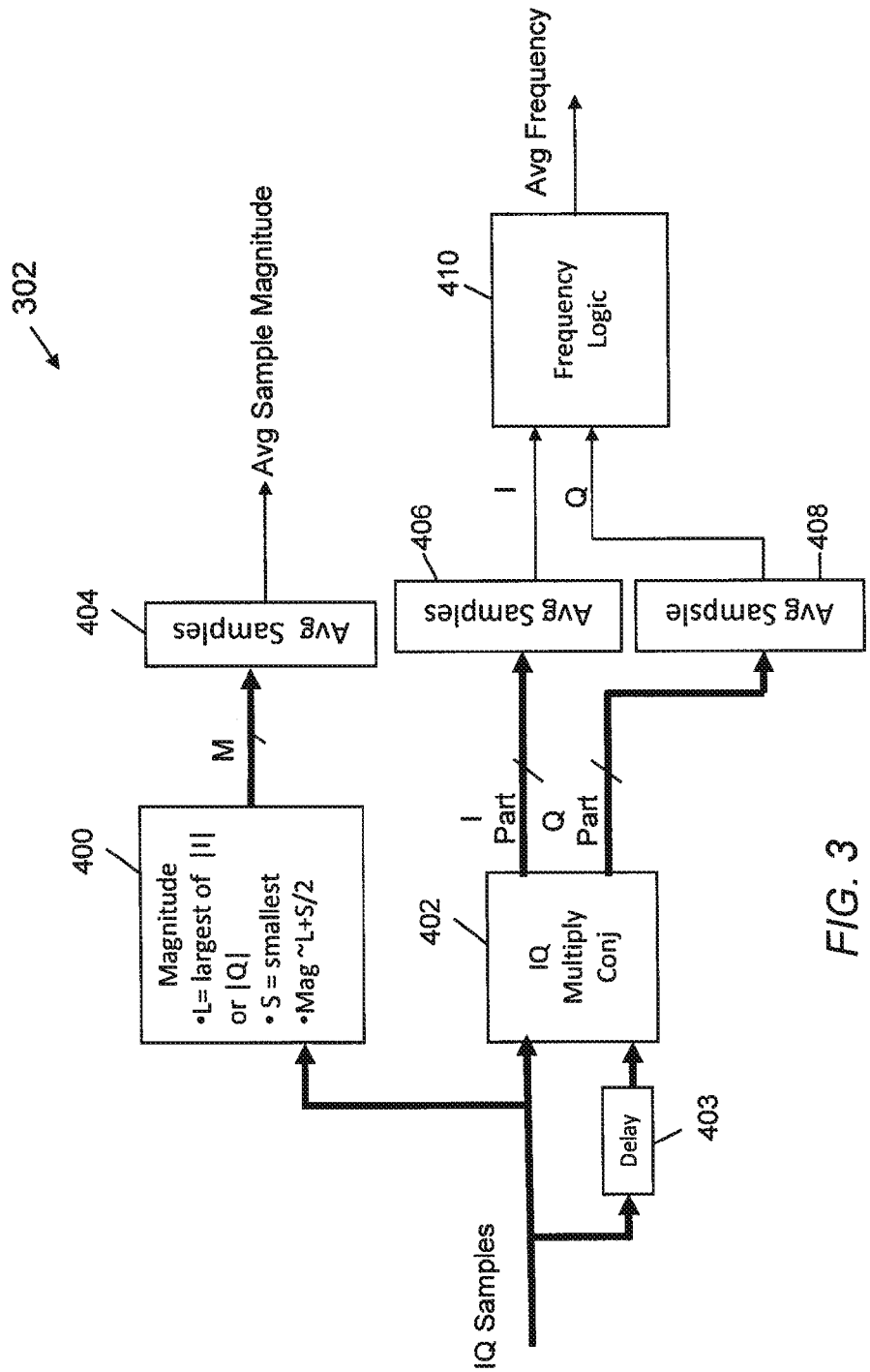
FIG. 3 is a block diagram conceptually illustrating a magnitude and frequency processor of the signal repeater of FIG. 2 according to an embodiment of the present invention.

FIG. 3 is a block diagram of the M/F processor 302 according to an embodiment of the present invention. The M/F processor 302 calculates the magnitude and frequency of the input signal IN from the I and Q samples of the signal. The I and Q samples can be represented in an exponential format such as $Ae^{(j2\pi*f*Ts*n)}$, which can be interpreted as a rotating vector with a variable n, where A=amplitude (or magnitude), f=frequency, Ts=sample period (second), n=$n^{th}$ sample (or sample index number in a series of samples). Using the exponential format, a constant expression, $A2e^{(j2\pi*f*Ts)}$, can be calculated by conjugate multiplying a current I/Q sample with a previous I/Q sample. Then, the phase of the input signal IN can be determined as phase=ATAN(Q/I), and frequency can be scaled from the phase.

Referring to FIG. 3, a magnitude calculation block 400 is configured to calculate the magnitude (M) of the input signal IN based on the IQ samples. An IQ multiply block 402 and a delay 403 are configured to perform conjugate multiply of a current IQ sample and a previous IQ sample. While FIG. 3 illustrates the input and output connections of the magnitude calculation block 400 and the IQ multiply block 402 with single lines for clarity, each of the single lines represents multiple branches (e.g., eight branches). For each branch of the IQ samples, the magnitude calculation block 400 estimates the magnitude of the signal as Magnitude=L S/2, where L=largest of $|I|$ or $|Q|$, and S=smallest of $|I|$ or $|Q|$. The above described estimation of the magnitude can provide an accuracy of about six percent. Then, an average magnitude of the magnitudes of all the magnitude branches (e.g., eight branches) are calculated by an averaging circuit 404 to generate an average sample magnitude. However, the present invention is not limited to the above described estimation method, and other suitable estimation methods can be used.

Still referring to FIG. 3, the input IQ samples include polyphase samples. At the output of the IQ multiply block 402, respective I and Q parts of the polyphase samples are obtained. Here, frequency of the input signal IN can be calculated from the values of the I and Q parts. In order to improve the signal-to-noise ratio (SNR) to be greater than about six dB or so for reliable results, the effective SNR can be improved for weak signals in the wide bandwidth by averaging multiple samples (e.g., eight samples) of the I parts and Q parts by averaging circuits 406 and 408, respectively. With the calculated average I and Q, the M/F processor 302 includes a frequency logic 410 configured to calculate the phase of the input signal. Because the phase can be expressed in terms of frequency as Phase=$2\pi*f*Ts$ (where Ts is sampling period), the average frequency of the input signal can be calculated as f=Phase/$2\pi*Ts$.

Figure 4:
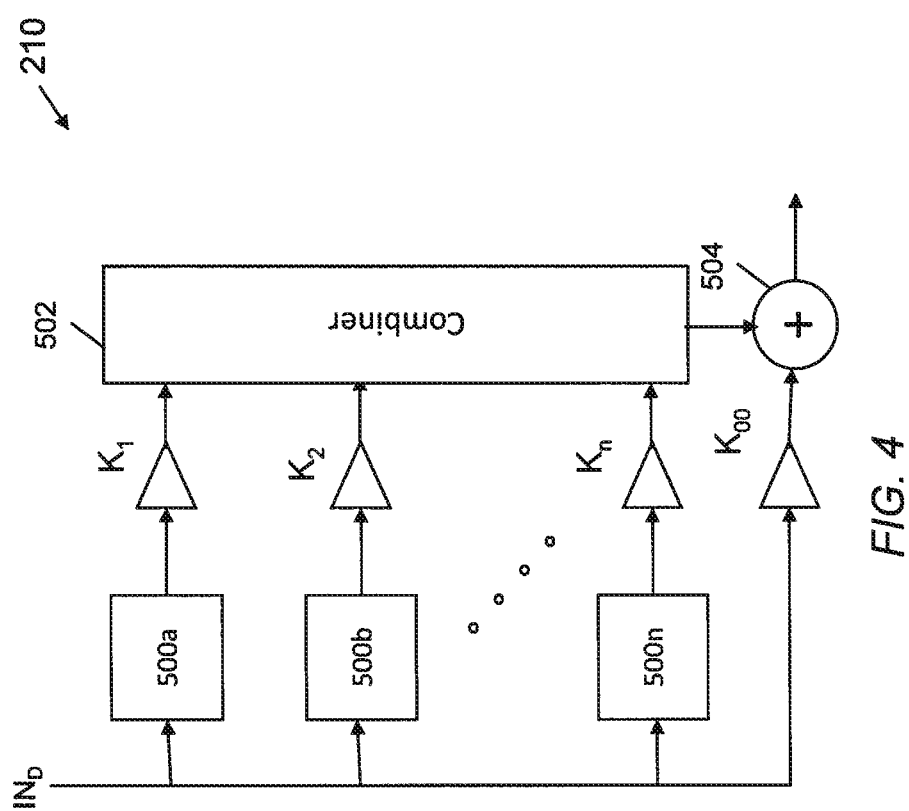
FIG. 4 is a block diagram conceptually illustrating a delay of the signal repeater of FIG. 2 according to an embodiment of the present invention.

FIG. 4 is a block diagram conceptually illustrating the delay 210 according to an embodiment of the present invention. In FIG. 4, the delay 210 is implemented as a tap delay that includes multiple programmable delay blocks (500a-500n), scalers ($K_1$-$K_n$), a combiner 502, and an adder 504. The delay 210 can be configured to add at least one clock latency to the signal repeating part 204 (see FIG. 2). In one embodiment, the delay blocks (500a-500n) can be implemented with block RAMs (e.g., dual port RAM) to generate different delays or latencies that can be programmable. The scalers ($K_1$-$K_n$) scale the signals from the delay blocks (500a-500n) according to their corresponding scaling factors (e.g., $K_1, K_2 \ldots K_n$). The combiner 502 combines the scaled signals to generate a combined signal, which is added to a undelayed scaled (e.g., $K_{00}$) input signal to synthesize a realistic radar return from the single received pulse. In one embodiment, the delay 210 includes sixteen delay blocks and sixteen scalers.

With the delay 210, the signal repeating part 204 can simulate realistic radar return signals that include individual reflections from various aspects of the targeted structure, which in turn occur at slightly different ranges or delays. Therefore, the programmable delay blocks (500a-500n) of the delay 210 can simulate structure reflections (relative delays) and their combinations. However, the present invention is not limited to the delay 210 as illustrated in FIG. 4. In several embodiments, other suitable delay configurations may be used. In some embodiments, the delay 210 may not be included or used. It should be appreciated that while the signal repeater 200 is described above in terms of a number of functional blocks and units, the signal repeater 200 is not limited thereto. To the contrary, the signal repeater 200 can include other parts or components that are commonly known in the art. Further, the various components of the signal repeater 200 can be implemented by a single circuit component (e.g., FPGA) or multiple circuit components operatively coupled together.

In several embodiments, the signal repeater 200 can be operated in two modes. In a first mode, a threat signal-of-interest (SOI) is being tracked in time by a suitable tracker (e.g., IRTG Tracker). The tracker predicts the occurrence of future pulses of a pulse train. A Time Gate is generated that spans the time extent of a predicted future pulse. This Time Gate is utilized to pass signals that occur within the Time Gate and inhibit signals that occur outside the Time Gate. Typical radars exhibit a duty factor (portion of the total time the radar is transmitting) of less than one percent, so that the Time Gate can inhibit the preponderance of undesired signals. For Frequency Agile radars, the radio frequency (RF) of the emitted signal is random so it cannot be predicted from the tracker. The RF is measured in the quench path when a pulse is detected, along with other parameters such as pulse width. These measurements on a received pulse are input to the EA Pulse Gate Logic where it is reconciled with the SOI Track Info. If the pulse measurements do not agree with the SOI Track Info, the repeater path is quenched (inhibited).

In the second mode, the SOI is not tracked in time, so the pulse Time Gate is not available, and the measurements are wide open in time. This mode can be used for the situation where EA is performed on the first radar pulses emitted, i.e. pulses that occur before the IRTG can establish a track. Nonetheless, measurements are then performed on every received pulse. These pulse measurements are reconciled with SOI Track Info as before in mode one. The SOI Track Info also includes track information on all visible emitters that is used to inhibit jamming non-threat emitters, thus simplifying the recognition of a new threat SOI.

Figure 5:
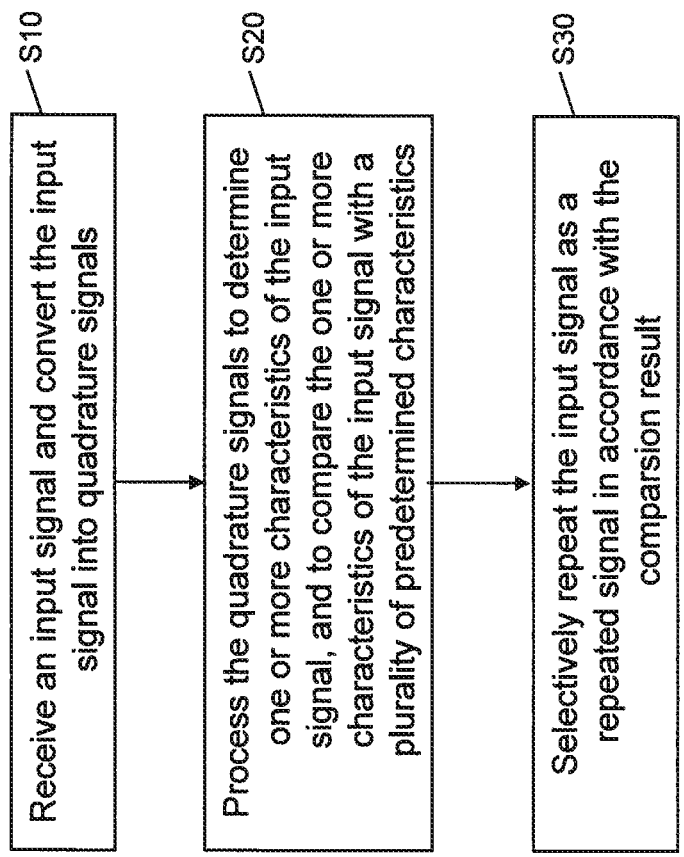
FIG. 5 is a flowchart illustrating a method of operating a signal repeater according to an embodiment of the present invention.

FIG. 5 is a flowchart illustrating a method of operating a signal repeater according to an embodiment of the present invention. In block S10, the signal repeater is operated to receive and convert an input signal into quadrature signals. In block S20, the signal repeater is operated to process the quadrature signals to determine one or more characteristics of the input signal, and to compare the one or more characteristics of the input signal with a plurality of predetermined characteristics (e.g., a pulse gate, a frequency range, a pulse amplitude, etc.) to generate a comparison result. In block S30, the signal repeater is operated to selectively repeat the input signal as a repeated signal in accordance with the comparison result.

According to embodiments of the present invention, a digital wideband repeater with relatively low latency quench/inhibit functions as compared to the related art can be provided. Low latency signal parameter measurements and processing are facilitated by converting the signal of interest into corresponding I and Q parts by a suitable digital quadrature FIR. Then, the frequency of the signal can be efficiently derived from a conjugate multiply which in turn is I/Q averaged to improve wideband SNR by about seven dB, prior to the arc-tangent calculation that requires at least six dB SNR. Magnitude of the signal is approximated and is also averaged. The calculated frequency is reconciled with an a priori input for possible quench action.

In the above described embodiments, the process or method can perform the sequence of actions in a different order. In another embodiment, the process or method can skip one or more of the actions. In other embodiments, one or more of the actions are performed simultaneously or concurrently. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A signal repeater comprising:
   a signal processing part comprising:
   a converter configured to receive an input signal and to convert the input signal into quadrature signals comprising a plurality of polyphase samples; and
   a processor configured to:
   calculate magnitudes of each of the plurality of the polyphase samples, and calculate an average magnitude based on the calculated magnitudes, and
   calculate frequencies of each of the plurality of polyphase samples by conjugate-multiplying, and calculate an average frequency of each of I and Q portions based on the calculated frequencies; and
   compare the average magnitude and the average frequency of the input signal with a plurality of predetermined characteristics to generate a comparison result; and
   a signal repeating part configured to selectively repeat the input signal as a repeated signal in accordance with the comparison result,
   wherein the processor is configured to calculate the magnitude of the input signal according to an equation defined as
   Magnitude=L+S/2, where L=largest of |I| or |Q| of the quadrature signals, and S=smallest of |I| or |Q| of the quadrature signals.

2. The signal repeater of claim 1, wherein the converter comprises a quadrature FIR configured to generate the quadrature signals.

3. The signal repeater of claim 1, wherein the conjugate-multiplying comprises conjugate-multiplying a current sample of the quadrature signals with a previous sample of the quadrature signals.

4. The signal repeater of claim 1, wherein the plurality of predetermined characteristics comprise at least one of a pulse gate, a frequency range, or a pulse amplitude.

5. The signal repeater of claim 1, wherein the signal repeating part is configured to inhibit the input signal when the average magnitude and the average frequency of the input signal do not correspond to the plurality of predetermined characteristics.

6. The signal repeater of claim 1, wherein the signal repeating part is configured to repeat the input signal when at least one of the average magnitude and the average frequency of the input signal matches a corresponding one of the plurality of predetermined characteristics.

7. The signal repeater of claim 1, wherein the signal repeating part further comprises a delay configured to delay the input signal by different latencies.

8. A method for operating a signal repeater, the method comprising:
   receiving an input signal and converting the input signal into quadrature signals comprising a plurality of polyphase samples;
   calculating magnitudes of each of the plurality of the polyphase samples, and calculating an average magnitude based on the calculated magnitudes;
   calculating frequencies of each of the plurality of the polyphase samples by conjugate-multiplying, and calculating an average frequency of each of I and Q portions based on the calculated frequencies;
   comparing the average magnitude and the average frequency of the input signal with a plurality of predetermined characteristics to generate a comparison result; and
   selectively repeating the input signal as a repeated signal in accordance with the comparison result,
   wherein the magnitude of the input signal is calculated according to an equation defined as
   Magnitude=L+S/2, where L=largest of |I| or |Q| of the quadrature signals, and S=smallest of |I| or |Q| of the quadrature signals.

9. The method of claim 8, further comprising operating a quadrature FIR to convert the input signal into the quadrature signals.

10. The method of claim 8, wherein the conjugate-multiplying comprises conjugate-multiplying a current sample of the quadrature signals with a previous sample of the quadrature signals.

11. The method of claim 8, wherein the plurality of predetermined characteristics comprise at least one of a pulse gate, a frequency range, or a pulse amplitude.

12. The method of claim 8, further comprising inhibiting the input signal when the average magnitude and the average frequency of the input signal do not correspond to the plurality of predetermined characteristics.

13. The method of claim 8, wherein the selectively repeating the input signal comprises repeating the input signal when at least one of the average magnitude and the average frequency of the input signal matches a corresponding one of the plurality of predetermined characteristics.

14. The method of claim 8, further comprising delaying the input signal by different latencies.

\* \* \* \* \*